United States Patent
Ramesh et al.

(10) Patent No.: US 12,425,370 B1
(45) Date of Patent: Sep. 23, 2025

(54) PRESERVING SECURITY INFORMATION OVER NAT ENABLED DEVICES USING ENCAPSULATION

(71) Applicant: Palo Alto Networks, Inc., Santa Clara, CA (US)

(72) Inventors: Uttam Ramesh, Sunnyvale, CA (US); Jayant Jain, Cupertino, CA (US); Brian Russell Kean, Cincinnati, OH (US); Aditya Srinivasa Ivaturi, Santa Clara, CA (US); Srikanth Ramachandran, Hayward, CA (US); Nidhi Shah, San Jose, CA (US); Srikanth Mulakaluri, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 18/883,621

(22) Filed: Sep. 12, 2024

(51) Int. Cl.
*H04L 9/40* (2022.01)

(52) U.S. Cl.
CPC ...... *H04L 63/0236* (2013.01); *H04L 63/0227* (2013.01); *H04L 63/029* (2013.01)

(58) Field of Classification Search
CPC .................. H04L 63/0236; H04L 63/0227; H04L 63/029
See application file for complete search history.

(56) References Cited

U.S. PATENT DOCUMENTS

| | | | | |
|---|---|---|---|---|
| 6,957,346 B1* | 10/2005 | Kivinen | | H04L 63/0428 |
| | | | | 713/153 |
| 2003/0131263 A1* | 7/2003 | Keane | | H04L 61/00 |
| | | | | 713/153 |
| 2007/0288645 A1* | 12/2007 | Kass | | H04L 67/59 |
| | | | | 709/227 |
| 2015/0113629 A1* | 4/2015 | Park | | H04L 63/02 |
| | | | | 726/13 |
| 2020/0296077 A1* | 9/2020 | Poon | | G06F 9/45558 |
| 2023/0045247 A1* | 2/2023 | Talur | | H04L 43/0823 |

* cited by examiner

*Primary Examiner* — Huan V Doan
(74) *Attorney, Agent, or Firm* — Van Pelt, Yi & James LLP (57) ABSTRACT

A data packet is received. It is determined whether the data packet is encapsulated. One or more security policies are applied to the data packet based on whether the data packet is encapsulated.

18 Claims, 7 Drawing Sheets

PRESERVING SECURITY INFORMATION OVER NAT ENABLED DEVICES USING ENCAPSULATION

BACKGROUND OF THE INVENTION

Devices on a shared network will often use the same Network Address Translation (NAT) device as a gateway to other networks and/or a router for network data packets. A NAT device can be used to control the traffic from the shared network to a network secured by a firewall. A firewall generally protects networks from unauthorized access while permitting authorized communications to pass through the firewall. A firewall depends on identifying information in the communication request, such as the Internet Protocol (IP) address of the original sender, in order to determine authorization.

A NAT device can be enabled to perform source network address translation (SNAT) on all of the communications sent out of the shared network. SNAT is a process that replaces information that identifies specific users of the network with information that can only be used to identify the NAT device. The firewall decides whether to permit communications with the network devices based on the identifying information associated with the NAT device. As a result, client devices on the network that should not be granted access may have resources protected by the firewall. Furthermore, client devices on the network that should be granted access may not have access to resources protected by the firewall.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Systems and methods to enhance a firewall's ability to apply one or more security policies on network traffic are disclosed herein. The systems and methods disclosed herein enable a firewall to implement one or more security policies with granularity, such that client devices that should not be granted access to particular resources protected by the firewall are not granted access to the particular resources and client devices that should be granted access to particular resources protected by the firewall are granted access to particular resources. SNAT is a process that is performed by a NAT device, such as a router or gateway, in which identifying information in network traffic is replaced with information that only identifies the NAT device. For example, before reaching a NAT device, one or more data packets sent by client devices on the same network have distinct IP addresses. However, upon reaching the NAT device, each client device's IP address will be replaced by the NAT device's IP address. The NAT device will then route the one or more data packets to a destination. In some networks, the NAT device sends the one or more data packets to a firewall.

A firewall generally protects networks from unauthorized access while permitting authorized communications to pass through the firewall. A firewall may be a device or a set of devices, or software executed on a device, such as a computer, which provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls may deny or permit network transmission based on a set of rules. These sets of rules are often referred to as policies. For example, a firewall can filter inbound or outbound traffic by applying a set of rules or policies. Firewalls can also be capable of performing basic routing functions. It is often desirable for a firewall to receive traffic from a NAT device.

Other systems may apply one or more security policies before performing SNAT. In these other systems, different security policies may be applied to users when connecting from different regions. This is because different regions may have different NAT devices. Therefore, the firewall will apply different security policies to the same user because it can only determine the IP of the region-specific NAT device and not the IP of the actual user. This system is undesirable because users will have inconsistent security policies when attempting to access data. For example, a company employee may have access to a certain file on the company cloud while working at a first location (e.g., on-site) but will not have access to that file while working at a second location (e.g., remotely). This is because the data packets associated with the employee are routed through a different NAT device when at the second location and the firewall is applying the security policies of that NAT device.

In contrast, the systems and methods disclosed herein enable a firewall to consistently implement one or more security policies. The security policies are user-specific because the firewall knows which user sent the data packet. Instead of using the NAT device's information to apply security policies, the firewall utilizes the user's information. Therefore, users would experience consistent application of security policies regardless of the NAT device used to connect. Under these systems and methods, the company employee has the same access to an object protected by the firewall (e.g., a file, an application, a resource, etc.), regardless of the location from which the user is accessing the object.

In the systems and methods disclosed herein, a first device (e.g., a NAT device) receives a data packet from a client device. The first device performs encapsulation on the data packet. The data packet may be encapsulated using a generic network virtualization encapsulation (GENEVE) or any other encapsulation method, such as VLAN, MPLS, VXLAN, NVGRE, etc. After the data packet is encapsulated, the first device sends the encapsulated data packet to a second device (e.g., a firewall) which is configured to receive data packets.

The information encapsulated with the data packet can be any information that is associated with the data packet. In some embodiments, such information is used to identify the original sender of the data packet (e.g., source-IP address, IP Tags, User Tags MAC address, UUID, etc.). Information associated with the data packet is not limited to these types of information. Furthermore, the information associated with the data packet can be determined at the time the first device receives the data packet. For example, the information associated with the data packet could be temporal data of the reception of the data packet by the first device.

It is beneficial to encapsulate information associated with a data packet because this information may be lost or obfuscated when the first device performs another process on the data packet. For example, SNAT would obfuscate the source-IP address of the data packet. Therefore, when source-IP is not encapsulated with the data packet, downstream devices are not able to determine the source-IP of the data packet.

After encapsulation is used, a process such as SNAT may be applied to an encapsulated packet without losing or obfuscating the encapsulated information. A downstream device may decapsulate the encapsulated packet and have access to the information associated with the data packet (e.g., the identifying information associated with a sender of the data packet) and the data packet itself.

The second device determines whether the data packet is encapsulated. In some embodiments, the data packet is encapsulated. In response to a determination that the data packet is encapsulated, the second device decapsulates the encapsulated data packet. After decapsulation, the second device applies one or more security policies to the data packet based on the encapsulated information. The encapsulated information is useful to distinguish data packets even when they are sent from the same first device. These distinguishments are useful to the second device for applying security policies or performing other processes with the data packet. In some embodiments, the second device sends the data packet to its final destination. In some embodiments, the second device drops the data packet.

In some embodiments, the data packet is not encapsulated. In these embodiments, the second device does not decapsulate the data packet. The second device does not apply security policies based on encapsulated information. Instead, the second device applies the security policies for the NAT device which sent the data packet. Therefore, the second device is able to function with encapsulated data packets or data packets that have not been encapsulated.

Figure 1:
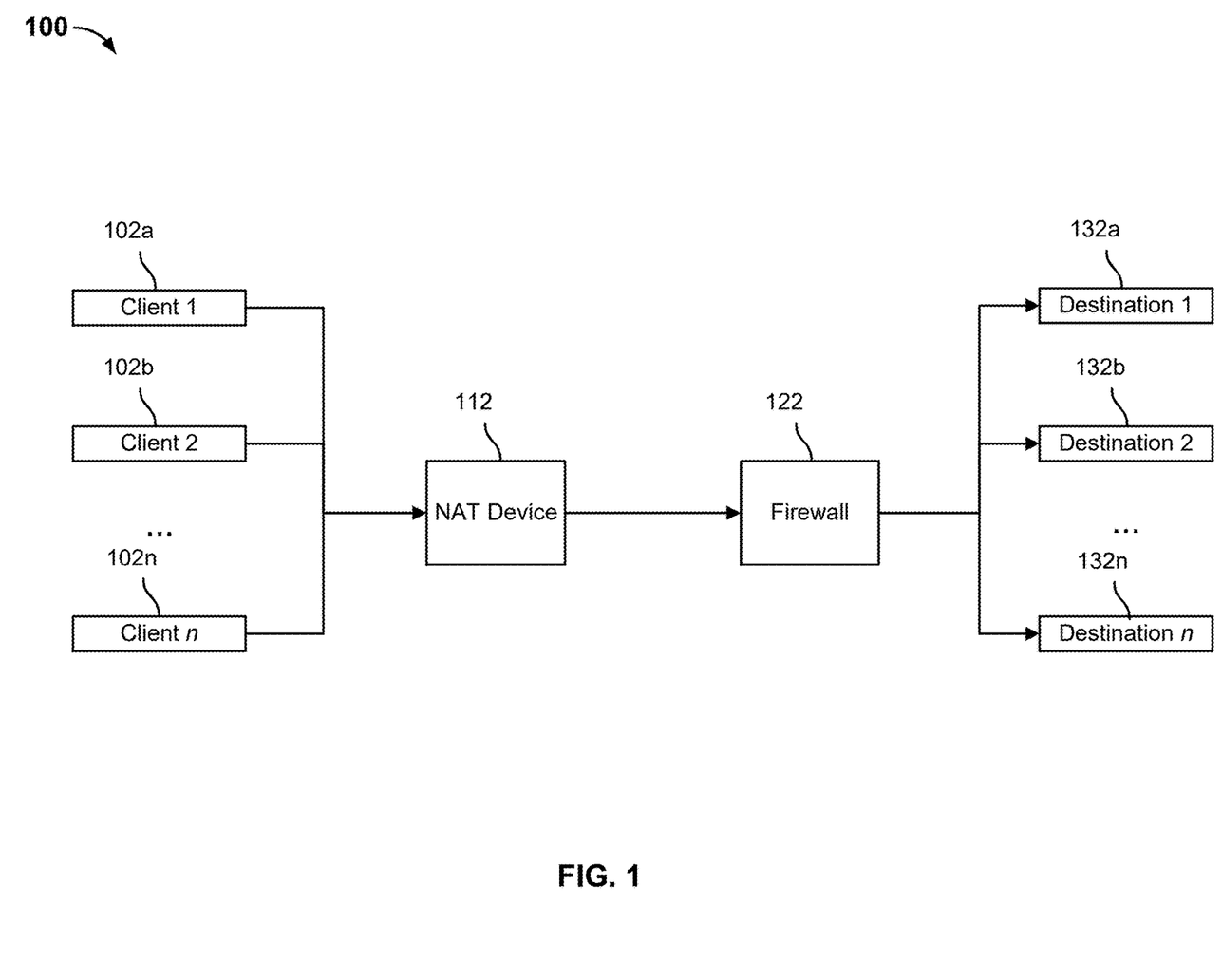
FIG. 1 is a block diagram illustrating a system to enhance a shared network's ability to apply one or more security policies on network traffic in accordance with some embodiments.

FIG. 1 is a block diagram illustrating a system to enhance a shared network's ability to apply one or more security policies on network traffic in accordance with some embodiments. In the example shown, system 100 includes client devices 102a, 102b, . . . , 102n. Although system 100 depicts three client devices, system 100 may include 1:n client devices. A client device may be a computer, a laptop, a desktop, a server, a virtual machine, a tablet, a smart device, a smartphone, or any other computing device. Client devices 102a, 102b, . . . , 102n are configured to send one or more data packets to NAT device 112.

NAT Device 112 is configured to receive a data packet, encapsulate the data packet, perform SNAT on the data packet, and send the encapsulated data packet to a next destination. In this example, the next destination is firewall 122. Firewall 122 may be associated with a destination, such as a datacenter. There may be one or more intermediate destinations before the data packet reaches firewall 122.

In some embodiments, NAT Device 112 is a router. In some embodiments, NAT Device 112 is a gateway. NAT Device 112 may perform SNAT, PAT, DNAT or other variations of NAT. NAT device 112 can be any device which is capable of routing network traffic.

Firewall 122 is configured to receive a data packet and then determine whether the data packet is encapsulated. In response to a determination that the data packet is encapsulated, firewall 122 is configured to decapsulate the encapsulated data packet, apply one or more security policies, and forward the data packet to a destination associated with the data packet. In some embodiments, the security policies which the firewall applies are based at least in part on the information that was encapsulated with the data packet.

In response to a determination that the data packet was not encapsulated, firewall 122 is configured to apply security policies, and forward the data packet to a destination associated with the data packet. In some embodiments, the security policies which the firewall applies are based at least in part on identifying information associated with the NAT device from which the data packet is received (e.g., an IP address associated with the NAT device).

Although FIG. 1 depicts firewall 122 receiving a data packet from NAT device 112, firewall 122 may receive a data packet from other types of devices. Furthermore, the firewall can be configured to send the data packet to many different devices. In some embodiments, firewall 122 is a direct connect (DC) firewall. In some embodiments, firewall 122 is a Next Generation Firewall (NGFW).

Firewall 122 is configured to forward a data packet to destinations 132a, 132b, . . . , 132n. Although FIG. 1 depicts three destinations, firewall 122 is configured to provide a data packet to 1:n destinations. A destination may include a server, a webserver, a database, a virtual machine, a service, a container, a computer, a smart device, or any other computing device. In some embodiments, the destination is determined based on a destination IP address included in a header associated with the data packet.

Figure 2:
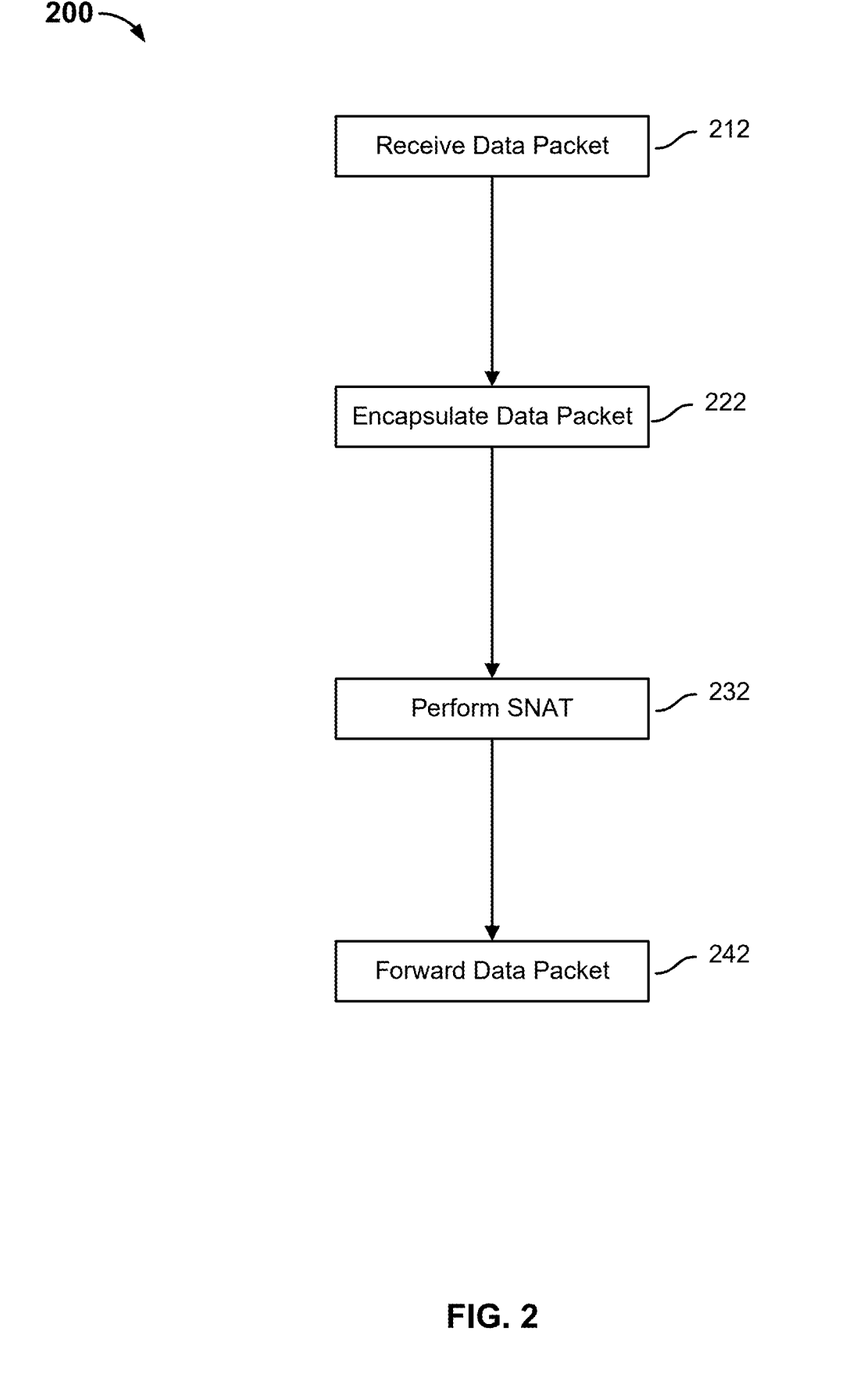
FIG. 2 is a flow diagram illustrating a process to enhance a shared networks security capabilities in accordance with some embodiments.

FIG. 2 is a flow diagram illustrating a process to enhance a shared networks security capabilities in accordance with some embodiments. In some embodiments, process 200 is implemented by a NAT device, such as NAT device 112. In some embodiments, process 200 is executed by one or more separate devices.

In some embodiments, a first device sends a data packet to second device, after the first device has executed part of process 200 on the data packet. In some embodiments, a first device performs steps 212-242. In some embodiments, a first device performs step 212 and a second device performs steps 222, 232, 242. In some other embodiments, a first device performs steps 212 and 222 while a second device performs steps 232 and 242. These are merely examples, and the process can be separated amongst devices in any manner.

At 212, a data packet is received. The data packet includes a header and a payload. A header of a data packet contains fields denoting information concerning the context of the data packet. Devices can be configured to route data packets with any arbitrary fields. The value of the fields can be used to determine context of the data packet. Such context can include information about the source of the data packet, the communication protocol of the data packet, the destination associated with the data packet, encoding information, or any other information. Source identifying information may include source-IP, MAC address, source port, etc. A data packet can have any number of headers each with any number of fields. A computing device can be configured to manipulate the fields within the headers of a data packet. For example, in SNAT, a NAT device changes the value of the source-IP field of a data packet's header to be the IP address associated with the NAT device.

The payload of a data packet can contain any type of data (e.g. a request for a file). The payload of a data packet can contain data that is contextualized by fields in the header.

A data packet can come from any client device which has access to the NAT device. The information associated with the data packet need not be contained in the data packet. In some embodiments, information associated with the data packet is determined by the NAT device, such as, the time the NAT device received the data packet. The NAT device can receive the data packet through any method which allows network communications to occur, such as IPSec tunnels. The NAT device is configured to receive data packets using any communication protocol, for example TCP/IP.

At 222, the data packet is encapsulated with information associated with the data packet. In some embodiments, this information is used to identify the original sender of the data packet (e.g. the client 102). However, information that is used for different means such as when the client sent the data packet can also be encapsulated with the data packet. Information associated with a data packet can include source-IP address, IP Tags, User Tags MAC address, UUID, etc. Information associated with the data packet is not limited to the types of information listed.

A firewall administrator can instruct the NAT device to encapsulate specific information associated with the data packet. The NAT device may encapsulate information that it determines at 212. The NAT device may also encapsulate information that is sent with the data packet. The NAT device is configured to use any encapsulation technique or a combination of encapsulation techniques. These may include GENEVE, VLAN, MPLS, VXLAN, NVGRE, etc.

At 232, SNAT is performed on the encapsulated data packet. SNAT is a process that is performed by a NAT device, such as a router, in which identifying information in network traffic is replaced with information that only identifies the NAT device. In network architecture, it is often desirable to perform SNAT on network traffic, because replacing device specific information with NAT device information may lead to increased security, privacy, simplicity of management and other benefits.

SNAT is not the only process used by NAT devices. Other methods include Port Address Translation (PAT), Full Cone NAT, Symmetric NAT, Destination NAT (DNAT), and others. Each of these methods obfuscates information associated with the network traffic it receives. It should be understood that the systems and methods described herein can be used with any of these methods. Further, it should be noted that devices such as VPN's utilize SNAT in there configuration. Therefore, the techniques disclosed herein can be used with these devices. The techniques disclosed herein can be used with any device which utilizes SNAT or similar processes to obfuscate information associated with network traffic.

In prior solutions, security policies may be applied by the NAT device prior to performing SNAT. Therefore, the security policies used for the data packet on downstream devices, such as a firewall, are the NAT device's security policies. After the NAT device's security policies are applied, SNAT replaces information associated with the data packet with information associated with the NAT device. However, the information associated with the data packet may have been useful for a downstream device to apply security policies pertaining to the particular data packet.

As a consequence of this procedure, when the data packet arrives at a downstream device, it can only apply security policies associated with the NAT device. In addition, the downstream device cannot use information associated with the data packet to apply security policies, because it has been obfuscated by the SNAT. This leads to an undesirable result where a user sending data packets will have inconsistent security policies when connecting to a downstream device through different NAT devices.

Process 200 addresses this by encapsulating information associated with the data packet 222 prior to performing SNAT on the encapsulated data packet 232. Such a configuration allows for the encapsulated information to be used by downstream devices for security policies and any other reasons.

At 222, encapsulation is achieved by concatenating data to the original data packet. In some embodiments, a field is added to the header of the packet which evaluates to a value that indicates the encapsulation of the packet. The information encapsulated with the packet is concatenated in a payload corresponding to an encapsulation technique.

For example, there will be a GENEVE field in the headers of a GENEVE encapsulated packet. The GENEVE field will evaluate to true, which indicates that the data packet is GENEVE encapsulated. The GENEVE encapsulated data packet will also have a GENEVE payload which contains information associated with the data packet. From the information determined by evaluating the GENEVE field, a device will know to find the GENEVE payload. This is merely an illustration of how encapsulation could work and does not limit systems and methods disclosed herein.

At 242, the data packet is sent to a next destination. In some embodiments, the NAT device is configured to send a data packet to a destination within the same network infrastructure. The NAT device may be configured to use any conceivable method of sending network data. The NAT device can also be configured to use any communication protocol to send the data packet, including TCP/IP, UDP, etc. In some embodiments, the NAT device is configured to send the data packet to the next destination using a secure tunneling technique.

Figure 3:
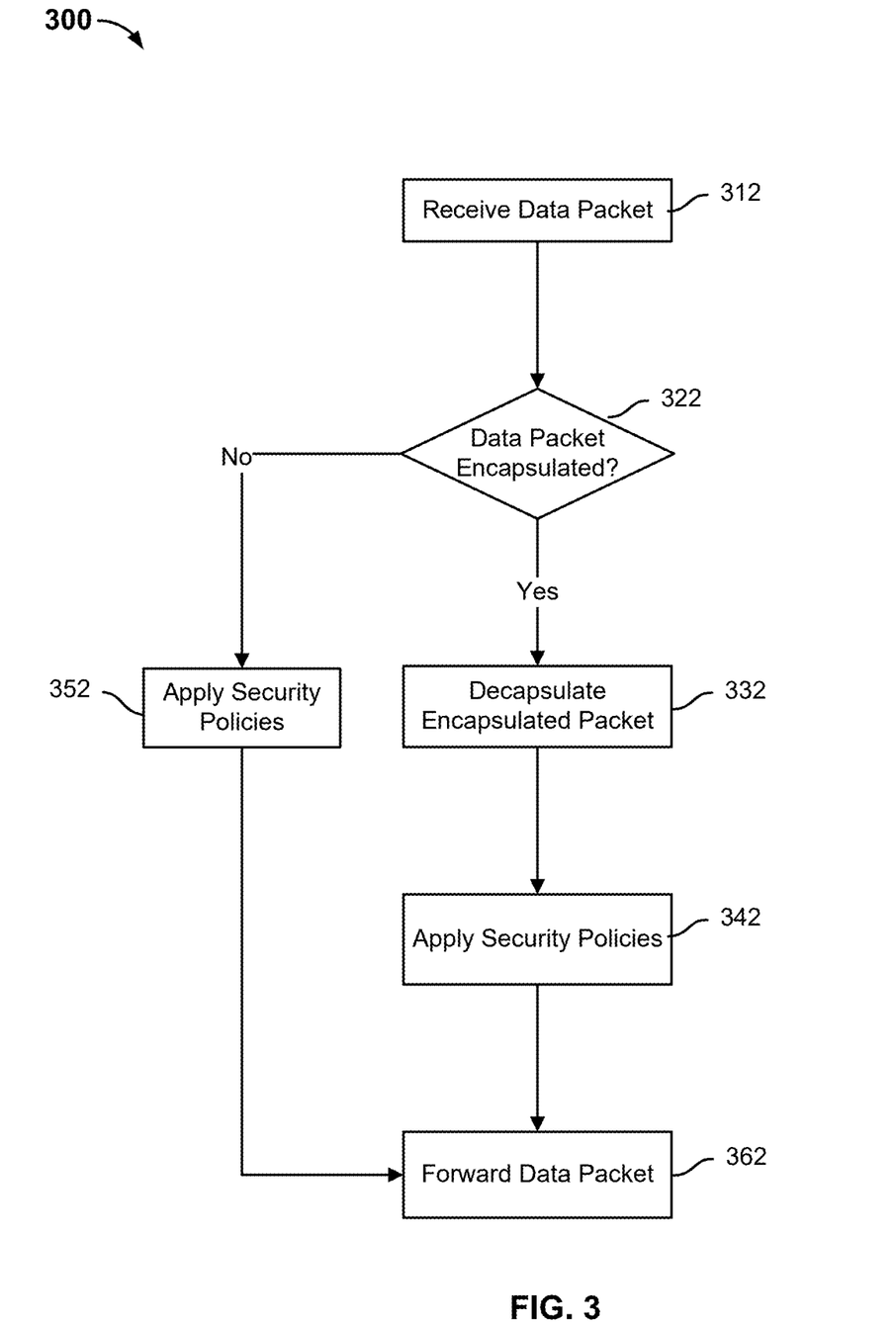
FIG. 3 is a flow diagram illustrating a process to enhance a device's ability to apply one or more security policies on network traffic in accordance with some embodiments.

FIG. 3 is flow diagram illustrating a process to enhance a device's ability to apply one or more security policies on network traffic in accordance with some embodiments. In some embodiments, process 300 is executed by a firewall, such as firewall 122.

At 312, a data packet is received. The device can receive the data packet by any way of receiving network data. The device can be configured to receive data packets using any network communication protocol.

At 322, it is determined whether the data packet is encapsulated. In some embodiments, the device makes this determination by examining the data packet headers for a field relating to the encapsulation of the packet. In some embodiments, a device is configured to evaluate the GENEVE field. The value of the GENEVE field indicates whether the packet is GENEVE encapsulated. In response to a determination that GENEVE field indicates the packet is encapsulated (e.g., true), process 300 proceeds to 332. In response to a determination that the field indicates the packet is not encapsulated (e.g., false), process 300 proceeds to 352. The value of the encapsulation field need not evaluate true or false, process 300 can be configured to utilize any value which signifies that the data packet is encapsulated with the encapsulation method denoted by the field.

In some embodiments, the device may query an encapsulation field on a packet which does not contain an encapsulation field. In response to this determination process 300 may continue to 352 or drop the packet. The device administrator may configure the device to accept packets without encapsulation, or to only accept packets which have been encapsulated.

It should be understood that process 300 is used to evaluate data packets with any encapsulation technique in the same manner as GENEVE encapsulation such as VLAN, MPLS, VXLAN, or NVGRE etc. For example, process 300 may be utilized to examine the packet for a VLAN header. In some embodiments, process 300 only proceeds with data packets with a particular encapsulation technique.

At 332, the encapsulated data packet is decapsulated. Decapsulation is accomplished by the device evaluating an encapsulated payload of a data packet. For example, in response to a determination at 322 that the data is GENEVE encapsulated, the process at 332 evaluates the GENEVE payload. The encapsulation payload contains the information encapsulated with the data packet. The encapsulation payload may contain any information that is associated with the data packet (e.g., a source IP address associated with an original sender of the data packet). Upon evaluation, the device running process 300 will have the information contained in the payload available. In some embodiments, the device is configured to store such information.

In some embodiments, 332 occurs one or multiple times. For example, in a response to a determination at 322 that the encapsulated data packet has been encapsulated with GENEVE and VLAN, process at 332 decapsulates the data packet with GENEVE and VLAN as described above. Therefore, at 332, the device executing process 300 may have available multiple pieces of information associated with the encapsulated data packet.

At 342, the device is configured to apply security policies. In some embodiments, security policies at 342 are applied at least in part based on the information associated with the data packet which became known at 332. The security policies are used to determine where the data packet received at 312 is authorized to be routed.

In some embodiments, security policies are known by the device prior to reception of the packet. In accordance with other embodiments, information such as security policies are learned contemporaneously with the reception of a data packet or after the packet has been received.

For example, a device executing process 300 may determine that a data packet has the source-IP 172.66.49.36 at 332. Prior to receiving the packet, the device contains an IP-lookup table which has an entry for source-IP 172.66.49.36. The entry is associated with all of the security policies for any data packet with this source-IP. The device will use this information to apply the security policies it determines are appropriate to the data packet.

In another example, the source-IP entry may point to a certain User-ID. The device can use another lookup table to determine the security policies for the source-IP's corresponding User-ID. The device will use this information to apply the security policies it determines are appropriate to the data packet.

In prior solutions, a device would not have access to the source-IP of the original data packet, because this information would not be encapsulated with the data packet and will be lost when an upstream device (e.g. a NAT device, gateway, router etc.) performs SNAT. Therefore, prior solutions are not able to apply security policies with consideration of certain information associated with the data packet.

A device executing process 300 is able to implement network security with greater flexibility and granularity. For example, a company employee is working on Project A and does not have access to files on Project B. The company employee's device sends a data packet to the company server with a payload that contains a request to access files in Project B. The device, a firewall, uses the information that has been decapsulated to determine that the data packet received originates from the employee's computing device. The firewall uses a lookup table to determine the employee's access. After the firewall determines the company employee's access, the firewall applies security policies to the company employee's data packet. These security policies bar this data packet's access to any files relating to Project B. As a result, the company employee's data packet will not be forwarded to its requested location.

In some embodiments, 342 can apply security policies based on other pieces of identifying information. For example, a company has a team of developers who are contractors and have a contractor role on the company's shared network. The device executing process 300 has access to information that developers with a contractor role are barred from accessing Project B. The encapsulated information allows the device to determine that certain data packets originate from the developers with a contractor role. In response to a determination that a data packet originates from a developer with a contractor role and the request of the data packet is to access files relating to Project B, the device does not allow the request to proceed. In some embodiments, the device would drop such a data packet.

In various other embodiments, the original sender of the data packet received at 312 need not be a person. For example, App A could be barred from sending data packets to App B.

It should be understood that at 342 the device can apply security policies in any manner which network security systems can be used to apply security policies. It should be understood that the information encapsulated with the data packet which is used to apply security policies at 342, can be any information associated with the data packet.

At 352, one or more security policies associated with a device from which the data packet is received are applied. Referring back to FIG. 1, suppose device 122 is executing process 300. In response to a determination at 322 that a data packet is not encapsulated, device 122 will apply security policies relating to NAT device 112. In this way, a device executing process 300 is able to receive and properly forward encapsulated data packets and data packets which are not encapsulated.

At 362, the data packet is forwarded to a destination based on an application of the one or more security policies. In some embodiments, the one or more security policies indicate to the device to forward the data packet. In some embodiments, the one or more security policies indicate to the device to drop the data packet. The device now knows the authorization level of the original sender of the data packet. Therefore, it can determine where it is authorized to send the data packet. In some embodiments, the device also logs the information known to it at 362. The device logs the information associated with the data packet which it gained at 332 along with information regarding the payload of the data packet. For example, the device can record and store that certain company employees attempted to access Project B, using their identifying information.

In some embodiments, the data packet's payload may contain an unauthorized request. In such embodiments, a device may drop the packet. In some embodiments, the device may forward the payload of the data packet with certain restrictions. In some embodiments, a data packet's payload may contain one or many requests for access. For example, a data packet could contain a request to access Destination A and to access Destination B. However, the device may determine at step 342 using information acquired at 332 that the original source of the data packet is not authorized to access Destination B, but is authorized to access Destination A. In this circumstance, the device may be configured to forward a whole or part of the data packet to Destination A, but not to Destination B. Therefore, a device which executes process 300 is able to properly apply security policies to data packets with multiple requests for access. The device need not drop a data packet if it contains one unauthorized request.

In prior solutions, a network administrator was unable to determine information associated with the data packet when it was received by the device from a SNAT enabled NAT device. In those prior solutions, the information was obfuscated when the NAT device performed SNAT on the data packet. With the application of process 300, a network administrator can understand granular information about the origins of network traffic. This is because the information has been encapsulated by the original sender of the data packet.

In some embodiments, a device executing process 300 drops the data packet. In some embodiments, the device is configured to drop the data packet if it determines that the original sender does not have authorization to establish communication with a destination. The device executing process 300 can be configured to drop a data packet upon a variety of determinations including, the lack of a certain encapsulation field, the evaluation of an encapsulation field to false, if the device determines that the data packet does not conform with the security policies, or for other reasons. In some embodiments, a device executing process 300 drops the data packet at any stage of process 300.

For example, the device executing process 300 may determine that the source-IP of a data packet is 172.66.49.36 at 332 because it is the encapsulated information. The device then determines 172.66.49.36 is associated with the User-ID of Employee A using information in an IP-lookup table. The network security at Employee A's company is set up so that Employee A is not authorized to access Project B. The device executing process 300 knows that Employee A does not have access to destinations pertaining to Project B. In response to a determination that the Employee A's data packet intends to access a destination pertaining to Project B, the device drops the data packet at 342 and does not proceed to 362. Therefore, Employee A's request to access a destination pertaining Project B is unsuccessful.

Figure 4:
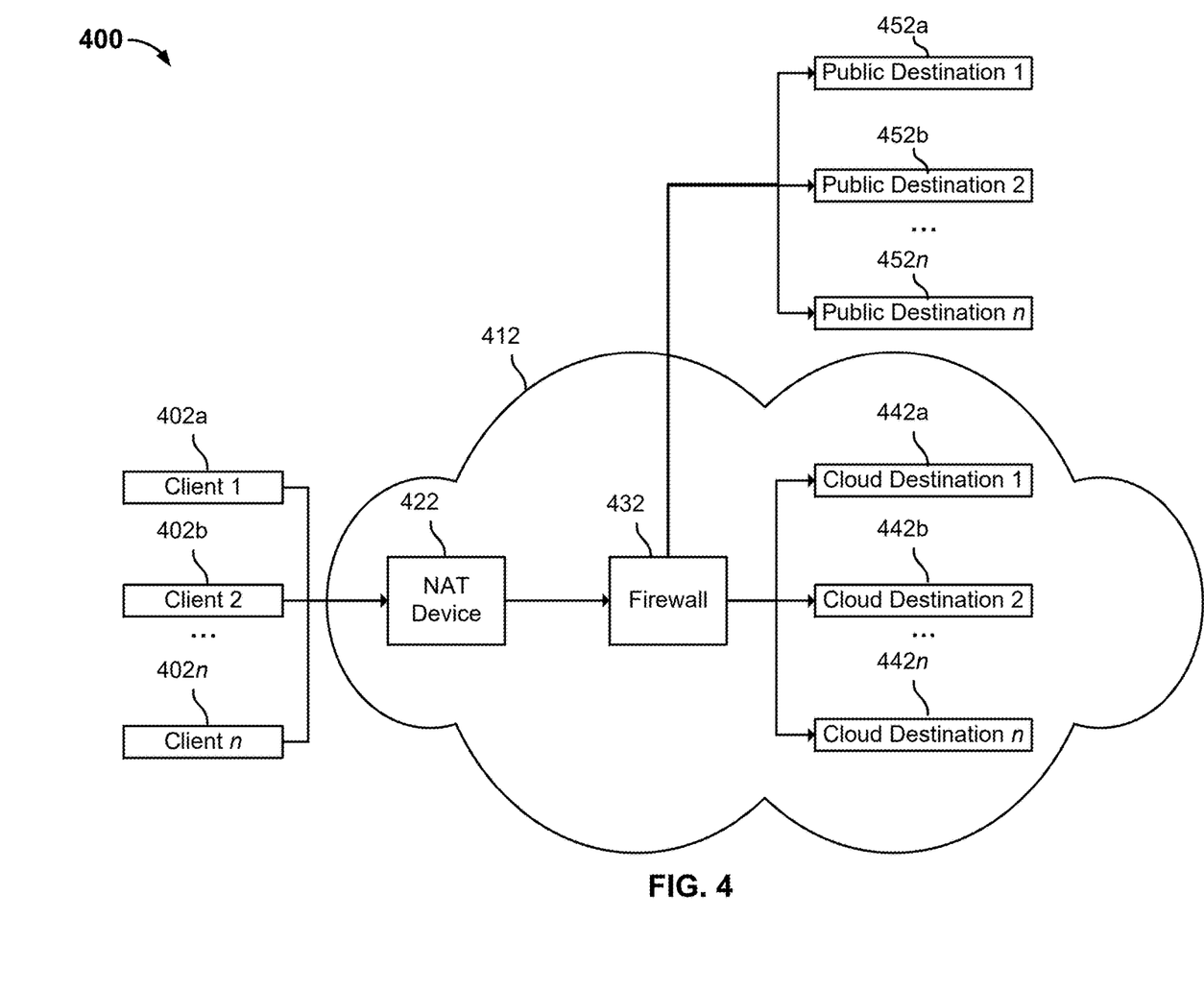
FIG. 4 is a block diagram illustrating a system to enhance a shared network's ability to apply one or more security policies on network traffic routed to destinations within and out of a shared network in accordance with some embodiments.

FIG. 4 is a block diagram illustrating a system to enhance a shared network's ability to apply one or more security policies on network traffic routed to destinations within and out of a shared network in accordance with some embodiments. In the example shown, clients 402a, 402b, . . . , 402n access shared network 412. Although system 400 depicts three client devices, system 400 may include 1:n client devices. Firewall 432 is configured to communicate with public destinations 452a, 442b, . . . , 442n or destinations within the shared network 442a, 442b, . . . , 442n. Although system 400 depicts six private and public destinations, system 400 may include 1:n destinations.

In some embodiments, shared network 412 is a cloud-based security platform. It should be understood that shared network 412 can be any network of computing devices. In some embodiments, NAT device 422 is configured to execute process 200. In some embodiments, firewall 432 is configured to execute process 300.

402a, 402b, . . . 402n are client devices with access to shared network 412. In some embodiments, the clients' data packets arrive in shared network 412 at NAT device 422. In some embodiments, NAT device 442 receives a clients' data packet, encapsulates the data packet, performs SNAT on the encapsulated data packet and forwards the encapsulated data packet to firewall 432 within shared network 412.

Firewall 432 receives the data packet and may forward the data packet to destinations within the shared network 442a, 442b, . . . , 442n or publicly available destinations 452a, 452b, . . . , 452n. The destination is determined based on a destination IP address included in the data packets header. Clients 402a, 402b, . . . , 402n use system 400 to access public resources (e.g. the Internet) on computing devices which network all traffic through shared network 412.

In some embodiments, firewall 432 is configured to apply policies to data packets which stop access to potentially malicious public resources. Such access may put shared network 412 at risk of being hacked. For example, firewall 432 may drop packets from client 402a that attempt to access malicious.com using a computer which is on shared network 412. In some embodiments, firewall 432 determines access of clients 402*a*, 402*b*, . . . , 402*n* to resources on a shared network 442*a*, 442*b*, . . . , 442*n* as described in process 300. For example, firewall determines if client 402*a* is authorized to access destination 422*b*.

Figure 5:
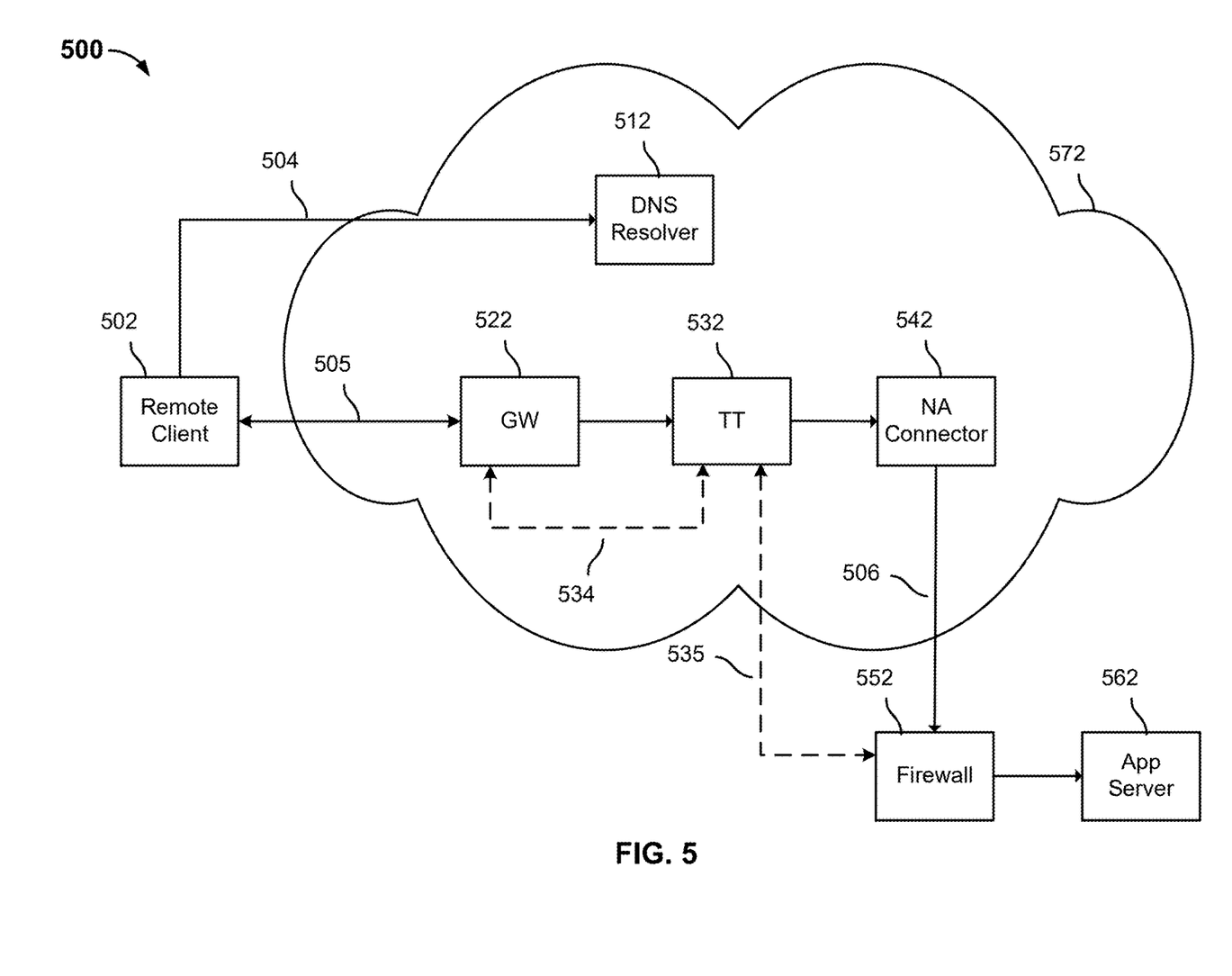
FIG. 5 is a block diagram illustrating an example network architecture of a system with enhanced ability to apply one or more security policies on network traffic in accordance with some embodiments.

FIG. 5 is a block diagram illustrating an example network architecture of a system with enhanced ability to apply one or more security policies on network traffic in accordance with some embodiments.

In some embodiments, remote client 502 is a mobile user (MU) or a remote network (RN). Remote client 502 sends a data packet to shared network 572. A gateway (GW) 522 is the first device which receives a data packet after it is sent to shared network 572. The data packet is also sent to Domain Name Server (DNS) resolver 512 on shared network 572. Gateway 522 forwards the data packet to Tunnel Terminator (TT) 532. Gateway 522 establishes a control plane connection 534 with a TT. TT 532 establishes a control plane connection 535 with firewall 552.

In FIG. 5 dashed lines, such as 534 and 535, represent control plane connections. Solid lines such as 505 represent data plane connections. In some embodiments, information relevant to the shared network is communicated through control plane connections, while network traffic, such as data packets, is communicated on data plane connections.

For example, User A logs into a company cloud through a log-in gateway (e.g. 522) on a mobile device with a source-IP. Once User A logs into the cloud through the gateway (e.g. 522), the cloud will know that User A's User-ID is associated with the device's source-IP. This association is an example of information that may be communicated amongst network devices through control plane connections (e.g. 534 and 535). On the other hand, User A's request to access a file will be communicated through the data plane connections (e.g. 505 and 506).

In some embodiments, a data packet is forwarded from TT 532 to Network Access (NA) connector 542. NA connector 542 receives the data packet, encapsulates information associated with the data packet, performs SNAT on the encapsulated data packet, and forwards the encapsulated data packet to firewall 552. In some embodiments, TT 532 and NA connector 542 execute process 200. Each device may execute a part or the whole of process 200.

In some embodiments, there are one or more TT's in a shared network. In some embodiments, there are one or more NA connectors in a shared network. In some embodiments, there are one or more gateways in a shared network.

In some embodiments, in order to connect with shared network 572, remote client 502 establishes a connection 505 to gateway 522. Connection 505 is made using any method that can be used to connect two computing devices. In some embodiments, remote client 502 utilizes software which is configured to establish connection 505 with gateway 522. In some embodiments, data plane connections 505 and 506 are tunnel enabled by IP Security (IPSec) protocol. In some other embodiments, data plane connections 505 and 506 are established by Secure Sockets Layer (SSL) protocol. In some embodiments, data plane connections 505 and 506 are bilateral connections.

In some embodiments, firewall 552 is outside shared network 572 as displayed in FIG. 5. However, in other embodiments firewall 552 is within shared network 572. In some embodiments, firewall 552 is configured to receive a data packet, determine if the packet is encapsulated, apply security policies to the data packet, and forward the data packet to a destination associated with the data packet, such as app server 562. Firewall 552 is configured to use control plane connection 535 to communicate information relevant to the shared network. In some embodiments, app server 562 is outside shared network 572 as displayed in FIG. 5. However, in other embodiments app server 562 is within shared network 572. In some embodiments, firewall 552 is configured to execute process 300.

In some embodiments, a remote client 502 is a Mobile User (MU) or a Remote Network (RN). Remote client 502 may be any computing device which connects to shared network 572. Remote client 502 also connects with DNS proxy 512, which is within shared network 572, through connection 504. Each connection 505 and 504 can be established using any method that can connect two devices and any communication protocol. It should be understood that remote client 502 is not necessarily remote, but can be any client device which connects to shared network 572.

In some embodiments, DNS resolver 512 is configured to resolve remote client's 502 request with a location in shared network 572. For example, if a remote client attempts to access internal.app.com, DNS resolver 512 will resolve internal.app.com to its respective internal IP address. This information is used to determine the destination associated with the data packet in a machine-readable form.

In some embodiments, remote client 502 is configured to access shared network 572 through gateway 522. Both devices are configured to establish a connection 505. In some embodiments, remote client 502 and gateway 522 establish any type of connection 505 such as tunnel, a proxy, etc. In some embodiments, connection 505 is a secured connection. In some embodiments, remote client 502 and gateway 522 are configured to engage in a continuous bilateral connection.

In some embodiments, after gateway 522 establishes a secure connection with remote client 502 and DNS resolver 512 resolves the destination of the communication, gateway 522 forwards data communications to TT 532.

In some embodiments, TT 532 receives a data packet and forwards it to a next destination. In some embodiments, TT 532 receives the data packet and forwards the data packet to NA connector 542. NA connector 542 encapsulates the data packet with information associated with the data packet, performs SNAT (or any other obfuscating process) on the encapsulated data packet, and forwards the data packet to a next destination. In some embodiments, NA connector executes process 200 in whole or in part.

In some embodiments, TT 532 receives a data packet from gateway 522, however, in other embodiments, TT 532 receives a data packet from a source outside of shared network 572.

In some embodiments, TT 532 may have associative mapping of the device available prior to the reception of the data packet. For example, in some embodiments, remote client 502 is integrated into shared network 572, such that shared network 572 knows that it's source-IP is associated with a particular User-ID.

In some embodiments, TT 532 is configured to implement the Zero-Trust methodology to network security. The Zero-Trust methodology enhances network security by using strong authentication methods, leveraging network segmentation, preventing lateral movement, etc. Zero-Trust methodology means that a device (e.g. TT 532) will not allow access or authorization to any data packet unless it is specifically configured to do so. It should be understood that the device at 532 need not implement the Zero-Trust methodology, this is merely an example of an implementation. TT 532 may be any device which can route traffic.

In some embodiments, NA connector 542 establishes a secure tunnel with a downstream destination automatically once a request is made by a client. Such a tunnel allows data packets to be routed to data centers, headquarter locations, public cloud locations, partner networks etc. In some embodiments, NA connector 542 implements Zero-Trust methodology, which has the same implications as described above. It should be understood that the device at 542 need not be configured in this manner. NA connector 542 may be any device which can route network traffic.

In some embodiments, NA connector 542 receives a data packet originally sent by remote client 502 through gateway 522. NA connector 542 then encapsulates the data packet with information associated with the data packet, performs SNAT on the encapsulated data packet, and forwards the data packet to a next destination. In some embodiments, NA connector 542 forwards the data packet to firewall 552 through data plane connection 506.

In some embodiments, information associated with the data packet is used to identify the original sender of the data packet (e.g. the remote client 502). However, information that is used for different means such as determining when the client sent the data packet can also be encapsulated with the data packet. A network administrator can instruct NA connector 542 to encapsulate specific information with the data packet. In some embodiments, NA connector 542 encapsulates information that it determines when the data packet is received. In some embodiments, NA connector 542 may also encapsulate information that is sent with the data packet. NA connector 542 may use any encapsulation technique or a combination of encapsulation techniques. These may include GENEVE, VLAN, MPLS, VXLAN, NVGRE etc.

In some embodiments, NA connector 542 performs SNAT on an encapsulated data packet. The process need not be SNAT but may be any process which obfuscates information associated with a data packet. NA connector 542 is configured to forward the encapsulated data packet to firewall 552.

In some embodiments, NA connector 542 executes process 200 in whole or in part. In some embodiments, TT 532 executes process 200 in part and forwards a data packet to NA connector 200 which completes process 200. In some embodiments, TT 532 executes process 200 in whole and forwards the encapsulated data packet to NA connector 542.

In some embodiments, firewall 552 receives the encapsulated data packet from NA connector 542. In some embodiments, firewall 552 is configured to execute process 300. Firewall 552 may receive data packets sent from any source which has access to the firewall, it need not be NA connector 542.

In some embodiments, firewall 552 receives a data packet. After the data packet is received, firewall 552 is configured to determine whether the data packet is encapsulated. Upon a determination that the data packet is encapsulated, firewall 552 decapsulates the encapsulated data packet, applies security policies to the data packet, and forwards or drops the data packet based on the application of one or more security policies. Upon a determination that the packet is not encapsulated, firewall 552 may apply security policies to the data packet and subsequently forward or drop the data packet.

In some embodiments, firewall 552 drops a data packet upon a determination that the data packet is attempting to gain unauthorized access. In some other embodiments, firewall 552 drops the data packet upon a determination that it is not encapsulated or not encapsulated in a particular manner.

In some embodiments, firewall forwards a data packet to app server 562. App server 562 receives data packets authorized to pass through firewall 542. In some embodiments, app server 562 is a destination which contains a running computer program. Upon access to the destination, data packets may be able to interact with applications by inputting data into the application or accessing outputs of the application. In some embodiments, one or more data packets arrive and facilitate a secure bilateral continuous connection between origin device 502 and the app server 562.

In some embodiments, gateway 522 determines and stores User Mapping information such as User-ID to source-IP information. This determination is made when a particular User uses its User-ID to establish a connection with gateway 522 on a particular device. In some embodiments, when a connection is established, gateway 522 is configured to determine and store the association between the source-IP of the particular device and the User-ID of the particular User. In some embodiments, this information is shared through control plane connections, such as 534 and 535, throughout the network. It should be understood that the source-IP can also be any information that identifies a device, and the User-ID can also be any information that identifies a user.

In some embodiments, control plane connections, such as 534 and 535, are implemented using any method which allows communication between two devices such as WebSocket's, HTTP, HTTPS, etc. Control plane connections can be used to communicate any information such as IP User Mappings, Host Information Profiles (HIP), IP Tags, User Tags, a Quarantine List etc.

In some embodiments, User Mapping information is communicated throughout a shared network by User-ID Redistribution agents. User-ID Redistribution allows a shared network to implement robust connections between clients and shared networks without being affected by the various locations of the clients or the shared networks.

In some embodiments, User-ID Redistribution is implemented such that identifying information about each device, which the network traffic is routed through, is determined and stored. In some embodiments, there are one or more User-ID Redistribution agents which facilitate the User-ID Redistribution. In some embodiments, User-ID Redistribution is the process which a shared network uses to communicate User Mapping information throughout the shared network.

For example, Company Employee A goes abroad and wants to access information on Company's server from Employee A's hotel. In order to do this, Employee A connects a mobile device to the Internet through the Hotel Router. Employee A logs into Company's server through a gateway (e.g. gateway 522) with User-ID A. Upon logging in, Employee A establishes a connection (e.g. connection 505).

At this point, Company server's gateway determines and stores that User-ID A is routing data packets from Employee A's mobile device to the gateway. However, the gateway may also store identifying information of the Hotel Router or any other device which User-ID A is routing network traffic through.

The gateway (e.g. gateway 522) maps User-ID A with the source-IP of Employee A's mobile device. The gateway communicates this mapping with another device (e.g. TT 532) through control plane connections (e.g. through control plane connection 534). This mapping is communicated to other devices on the network through control plane connections (e.g. 534 and 535). The mapping may include identifying information of the device's responsible for each hop on the Employee A's network traffic's path.

In some embodiments, gateway 552 forwards User Mapping information (e.g. User-ID to source-IP mapping) associated with remote client 502, to TT 532 through control plane connection 534. Gateway 552 also forwards one or more data packets originating from remote client 502. In some embodiments, TT 532 forwards the packet to NA Connector 542 and uses control plane connection 535 to forward User Mapping information to firewall 552.

In some embodiments, NA connector 542 receives the data packet, encapsulates the data packet with the information associated with the data packet (e.g. source-IP), performs SNAT on the encapsulated data packet and forwards the data packet to firewall 552.

In some embodiments, firewall 552 receives the data packet from NA connector 542 and the User-ID to source-IP mapping from TT 532. Firewall 552 stores the User-ID to source-IP mapping. Then, firewall 552 decapsulates the data packet and determines its source-IP. Firewall 552 can use the User-ID to source-IP mapping to determine a User-ID from the source-IP of the data packet. Now that firewall 552 has determined the User-ID, it is able to apply security policies associated with the User-ID to the data packet.

User-ID to source-IP mapping is a convenient demonstrative example. In various embodiments, any information that is used to identify associations between users, clients, devices etc. is User Mapping information that can be communicated by User-ID Redistribution agents. It should be understood that the User-ID can be any information that tends to a identify a user (e.g., name, company-ID number, username, etc.) and the source-IP can be any information that tends to identify a device (e.g., source-IP address, IP Tags, User Tags, MAC address, UUID, etc.)

In some embodiments, shared network 572 maps and stores the region from which remote client 502 connects to shared network 572. TT 532 may be associated with a particular region. In some embodiments, this is the region where TT 532 is physically located.

For example, Employee A's hotel is located in Region R. When Employee A connects to Company's shared network the network traffic is routed through a Region R TT. Company's shared network determines and stores the map of Employee A's network traffic using the IP addresses of each device. Such a mapping would indicate that Employee A's network traffic is being routed through Employee A's mobile phone, the Hotel Router, and a Region R TT.

In some embodiments, regional TT's (e.g. 532) share User Mapping information with other devices. In some embodiments, TT 532 or NA connector 542 may be able to recover the connections if a regional TT malfunctions.

For example, Region R TT crashes while Employee A connects to Company server. In this example, the User Mapping has previously been shared amongst the regional TT's. Therefore, another TT in Region R will know the mapping and can rapidly restore connection without having to determine that data packets received through the route are associated with Employee A.

In some embodiments, TT 532 is configured to receive User Mapping information from gateway 522 through 534 and forward that information to firewall 552 through 535.

It should be understood that the systems and methods disclosed herein may be implemented without User-ID Redistribution. In some embodiments, firewall 552 may have User Mapping information (e.g. User-ID to source-IP mapping) stored in memory. Therefore, it may not need to use control plane connections 534 nor 535 to acquire User Mapping information. For example, a firewall administrator could store User Mapping information before any data packets have been received by the firewall.

Figure 6:
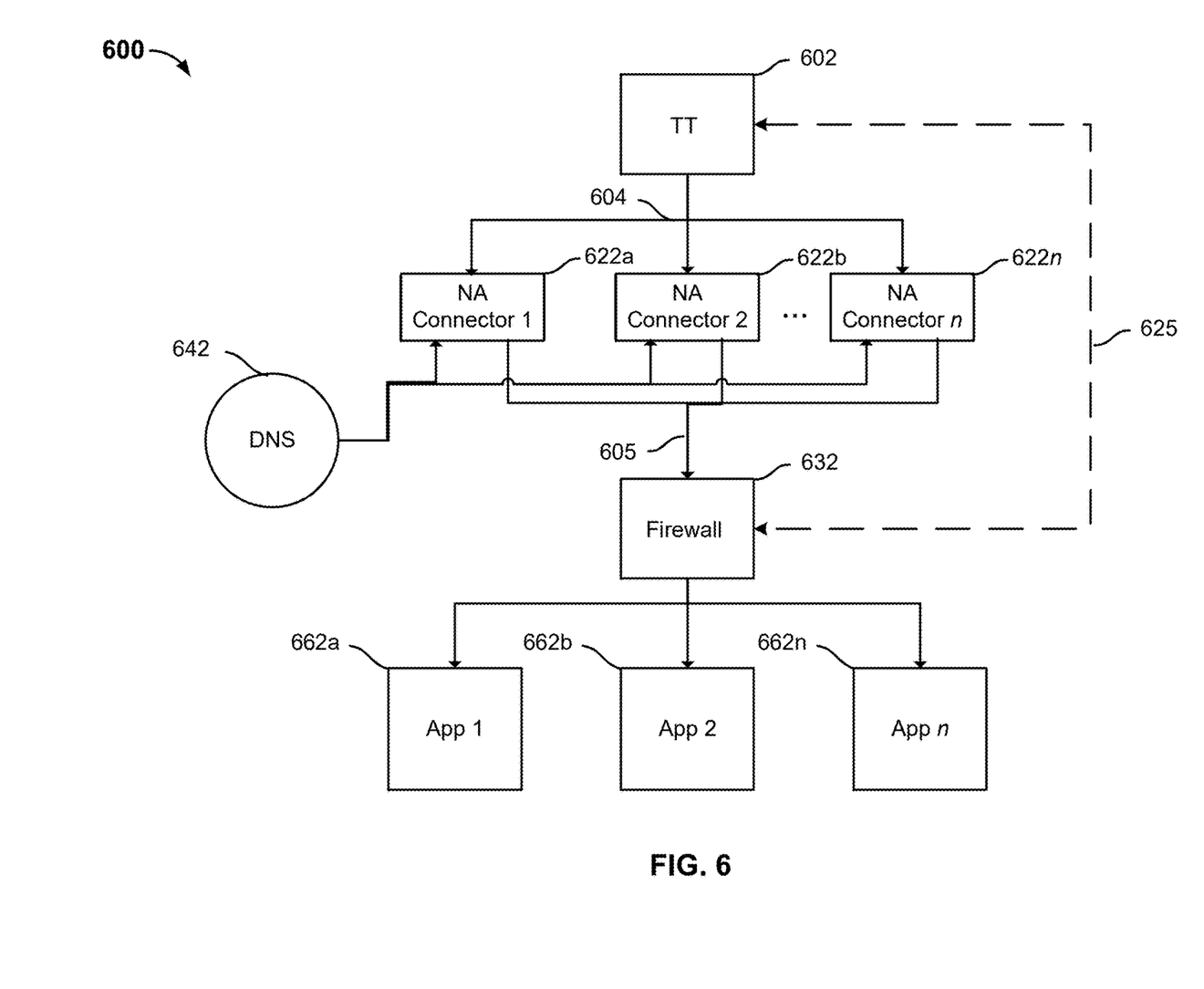
FIG. 6 is a block diagram illustrating a system which facilitates connections through a shared network using multiple NA connectors in accordance with some embodiments.
Figure 7:
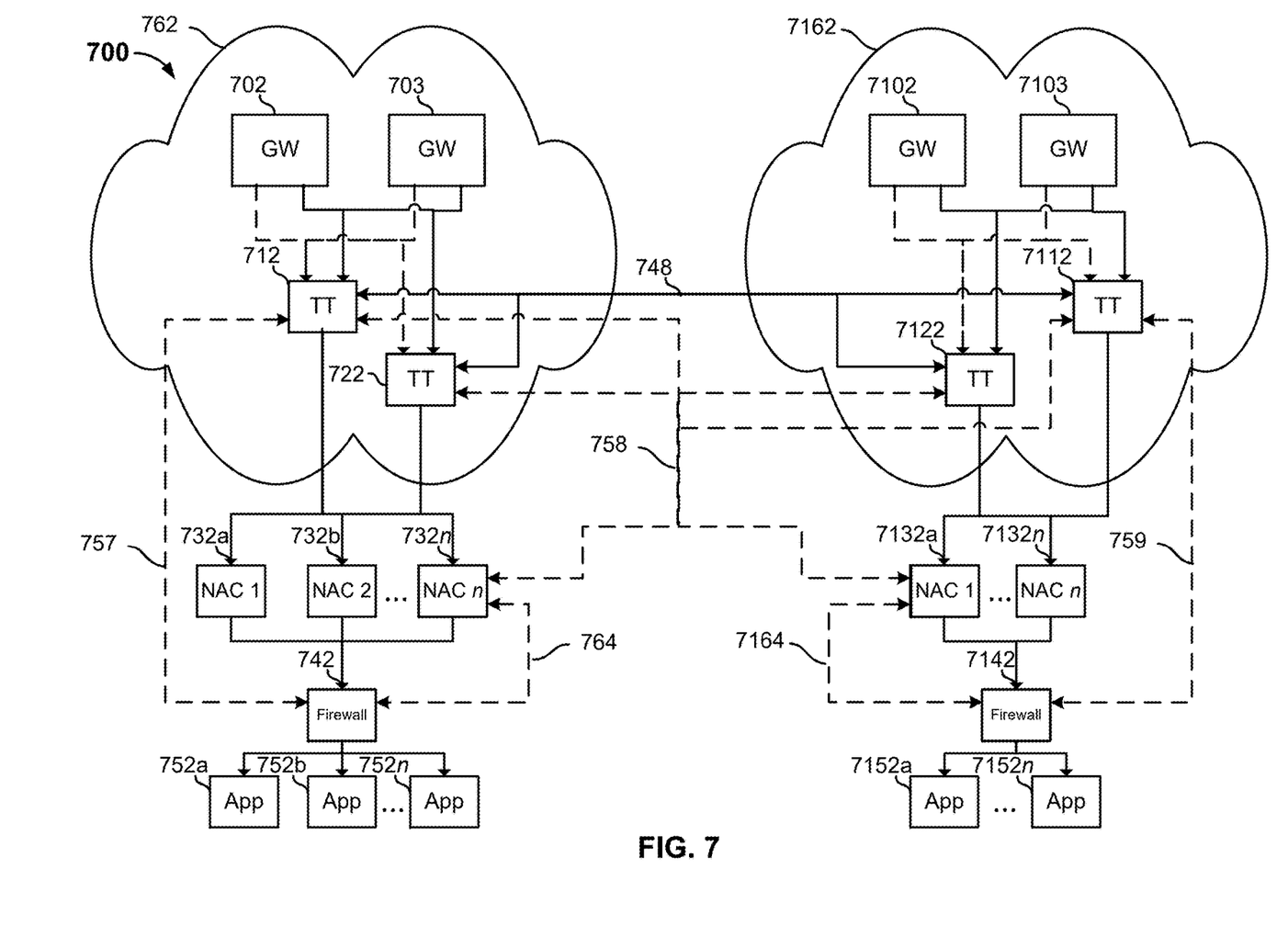
FIG. 7 is a block diagram illustrating an example of a system which contains two shared networks integrated into a mesh configuration in accordance with some embodiments.

In some embodiments, the systems depicted by FIG. 6 and FIG. 7 use the same components as FIG. 5, i.e. the gateway, TT, NA connector, firewall, App, etc., Therefore, it should be understood that in some embodiments depicted by FIG. 6 and FIG. 7 the components have all of the functionality described in FIG. 5 in addition to the functionality disclosed.

FIG. 6 is a block diagram illustrating a system which facilitates connections through a shared network using multiple NA connectors in accordance with some embodiments. System 600 can be implemented with any shared network of devices. Full lines such as 604 and 605 represent data plane connections while dashed lines such as 625 represent control plane connections. Control plane connections 625 and data plane connections 604 and 605 can be implemented using any method which can establish communication between two devices.

In some embodiments, TT 602 has a data plane connection 604 with multiple NA connectors 622a, 622b, . . . ,662n. NA connector 622n is configured to route packets received from TT 602 to firewall 632 through 605. DNS resolver 642 is configured to communicate with NA connectors 622a, 622b, . . . ,662n. Although FIG. 6 depicts three NA connectors, some embodiments of system 600 contain 1:n NA connectors. Firewall 632 is configured to apply security protocols and route the network traffic to App's 662a, 662b, . . . ,662n. Although FIG. 6 depicts three App's, some embodiments system 600 contain 1:n App's.

In some embodiments, system 600 routes data packets and User Mapping information (e.g. User-ID to source-IP mapping) through a shared network. In some embodiments, a shared network receives a data packet at TT 602, process 200 is executed with the data packet, the data packet is routed through NA connector 622n, NA connector forwards the data packet to firewall 632, process 300 is executed with the data packet, and firewall 632 forwards the data packet to a destination associated with the data packet.

In some embodiments, TT 602 can be any computing device which can route network traffic. NA connectors 622a, 622b, . . . ,662n, can be any device which can route network traffic. In some embodiments, TT 602 is configured to execute a part or a whole of process 200. In some embodiments, NA connector 622n is configured to execute part or a whole of process 200. In some embodiments, TT 602 and NA connector 622n execute process 200 together and TT 602 forwards a data packet to NA connector during process 200.

In some embodiments, TT 602 is the first device which receives a data packet after it is sent to a shared network. TT 602 is configured to have data plane connections 604 with one or a number of NA connectors 622a, 622b, . . . ,622n. TT 602 is also configured to have a control plane connection 625 with firewall 632. In some embodiments, control plane connection 603 is implemented using any means in which two devices can communicate with each other. TT 602 is configured to receive the data packet and forward the data packet to one or more NA connectors 622a, 622b, . . . ,622n.

In some embodiments, TT 602 is connected to one or a number of gateways (e.g. gateway 552). TT 602 is configured to receive data packets and User Mapping information from these gateways.

In some embodiments, TT 602 forwards a data packet to a particular NA connector 622n. In some embodiments, TT 602 is configured to determine which NA connector can accept communications at a given time. For example, upon a determination that an NA connector (e.g. 622a) failed, TT 602 is configured to forward the data packet to a different NA connector (e.g. 622b).

In some embodiments, TT 602 is able to route large numbers of data packets to the same destination through multiple NA connectors 622a, 622b, . . . ,622n in parallel. For example, if NA connector 622a is routing a high volume of network traffic routed for firewall 632, TT 602 is configured to divert any amount of network traffic through NA connector 622n. Thus, system 600 can load balance high volumes of network traffic.

In some embodiments, control plane connection 625 is configured to implement User-ID Redistribution. In some embodiments, the firewall administrator configures firewall 632 to accept control plane connections originating from a particular TT (e.g. TT 602). In some embodiments, the firewall administrator uses a User Interface (UI) to input the IP and Port of the device (e.g. TT 602) to which firewall 632 establishes control plane connection 625. Once this is done, there is a certificate exchange between the device and firewall 632. After both firewall 632 and the device authorize each other's certificates, a secure control plane connection 625 is established.

In some embodiments, a single TT in a region is used as the User-ID Redistribution agent for that region. A firewall administrator can set which particular TT is used as the User-ID Redistribution agent for a region to a shared network. The chosen TT will establish a connection with the firewall (e.g. firewall 632) and will forward all User Mapping information (e.g. User-ID to source-IP mapping) known in the region.

In some embodiments, the control plane connection 625 is facilitated by a NA connector 622n. In some embodiments, control plane connection 625 is facilitated by any means used to connect two computers in a network.

In some embodiments, a NA connector 622n is configured to receive a data packet from TT 602 through data plane connection 604. In some embodiments, a NA connector 622n is configured to receive the data packet, encapsulate information associated with the data packet, perform SNAT on the data packet and forward the data packet to firewall 632.

In some embodiments, multiple NA connectors are utilized. In some embodiments, when one NA connector fails another NA connector can recover a previously established connection. For example, TT 602 establishes a connection with NA connector 622a. The connection is an exchange such that, TT 602 expects a communication from NA connector 622a confirming a communication from TT 602 is delivered. In response to a determination by TT 602 that a predicted communication has not been made, TT 602 determines that NA connector 622a has gone offline. In such a scenario, TT 602 may route future communications through NA connector 622b.

In some embodiments, NA connectors 622a, 622b, . . . ,662n are configured to communicate with DNS resolver 642. In some embodiments, NA connector 622n can use the DNS resolver to determine the Local Area Network (LAN) IP of itself, the destination of the firewall, the destination associated with the data packet etc. After determining the required information, NA connector 622n is configured to forward the data packet to firewall 632.

In some embodiments, NA connectors 622a, 622b, . . . ,662n use IPSec tunnels to communicate with firewall 632. In some embodiments, NA connectors 622a, 622b, . . . ,662n use SSL to communicate with firewall 632. NA connectors 622a, 622b, . . . ,662n can communicate with firewall 632 using any method that two devices can communicate.

Firewall 632 is configured to receive data packets sent from one or multiple NA connectors 622a, 622b, . . . ,662n. The firewall administrator can configure the firewall to accept connections from a particular NA connector 622n. This is done by entering a NA connector's LAN IP into a UI which is used to configure firewall 632. In some embodiments, firewall 632 is configured to drop data packets sent from NA connectors that it is not configured to receive packets from.

In some embodiments, firewall 632 receives one or multiple data packets from NA connector 622n. After a data packet is received, firewall 632 is configured to determine whether the data packet is encapsulated. Upon a determination that the data packet is encapsulated, firewall 632 decapsulates the encapsulated data packet, applies security policies to the data packet, and forwards or drops the data packet based on the application of one or more security policies. Upon a determination that the packet is not encapsulated, firewall 632 may apply security policies to the data packet and subsequently forward or drop the data packet.

In some embodiments, firewall 632 is configured to execute process 300.

In some embodiments, firewall 632 drops a data packet upon a determination that the data packet is attempting to gain unauthorized access. In some embodiments, firewall 632 drops the data packet upon a determination that it is not encapsulated or not encapsulated in a particular manner.

In this example, the destination of firewall 632 are apps 662a, 662b, . . . ,662n. In some embodiments, the destinations can be any device which can receive network traffic.

FIG. 7 is a block diagram illustrating an example of a system which contains two shared networks integrated into a mesh configuration in some embodiments. While FIG. 7 only depicts two shared networks, this system can contain any number of shared networks each integrated in a mesh configuration. Lines that are full such as 748 represent data plane connections and lines that are dashed such as 758 represent control plane connections. In some embodiments, information relevant to the shared network is communicated on control plane connections, while network traffic, such as data packets, is communicated on data plane connections. Both types of connections can be facilitated using any method used to connect two devices.

Any description or embodiment of an aspect of FIG. 7 is applicable to any other aspect of the figure with the same label. For example, any description of gateway 702 is applicable to gateway 7102.

Although FIG. 7 depicts a certain number of each element, shared networks 762 and 7162 contain; one or more gateways (e.g. 702 and 7102), one or more TT's (e.g. 712 and 7112), one or more NA connectors (e.g. 732n and 7132n), one or more firewalls (e.g. 742 and 7142), and one or more apps (e.g. 752n and 7152n).

In some embodiments, shared networks 762 and 7162 are configured to share control plane information, so that control plane information within 7162 is accessible in network 762 and vice versa. This is facilitated by control plane connections 758. Connection 758 links TT's 712, 7112, 722 and 7122 with NA connectors (NAC's) in both regions. In some embodiments, any device is able to forward and receive information to any other device to which it is connected through connection 758.

In some embodiments, shared networks are configured to share data plane information, so that data plane information in 7162 is accessible in network 762 and vice versa. This is facilitated by data plane connections 748. Connection 748 links TT's 712, 7112, 722, 7122. In some embodiments, any device is able to forward and receive information to any other device to which it is connected through connection 748.

In some embodiments, control plane connections connect devices within the same shared network. Control plane connection 757 and 759 allow TT's 712 and 722 to communicate directly with firewall 742. In some embodiments, NAC 732n communicates control information directly with firewall 742. In some embodiments, NAC 732n is facilitating connection 757 between TT 712 and firewall 742.

In some embodiments, NAC 732n is receiving control plane information directly from other components in shared network 762 or from components in shared network 7162 such as TT 7112 through connection 758.

In some embodiments, when a client connects to shared network 762, the client establishes a connection with gateway 702. In some embodiments, gateway 702 is the first part of shared network 762 which receives network traffic from a client communicating with shared network 762. In some embodiments, gateway 702 forwards one or more data packets to a TT on shared network 762 such as TT 712 or TT 722. In some embodiments, gateway 702 forwards one or more data packets to a particular TT.

In some embodiments, gateway 702 determines and stores User Mapping information associated with network traffic, such as User-ID to source-IP mapping information. In some embodiments, gateway 702 forwards this information to a TT on the same network such as TT 712 or TT 722. In some embodiments, gateway 702 can be configured to send this information to a particular TT on the same shared network or another shared network.

In some embodiments, TT 712 is connected to one or more gateways (e.g. gateway 702). Through these connections, a gateway is configured to send User Mapping information to one or more TT's (e.g. 722 and 712).

In some embodiments, TT 712 forwards one or more data packets to a particular NAC 732n. In some embodiments, TT 712 is configured to determine which NAC can accept communications at a given time.

In some embodiments, NAC 732n is configured to receive a data packet from a TT in the same shared network, such as TT 712. In some embodiments, NAC 732n encapsulates the data packet with information associated with the packet. Next, NAC 732n is configured to perform SNAT or another process with may obfuscate information associated with the packet on the encapsulated packet. Next, NAC 732n forwards the packet to a next destination. In some embodiments, NAC 732n forwards the encapsulated packet to firewall 742.

In some embodiments, TT 712 executes process 200 in part or in whole. In some embodiments, TT 712 forwards one or more data packets to NAC 732n after executing part of process 200.

In some embodiments, NAC 732n executes process 200 in part or in whole. In some embodiments, NAC 732n receives a data packet from TT 712 after TT 712 has executed part of process 200 and fully executes process 200 on the data packet.

In some embodiments, NAC 732n is configured to receive User Mapping information through control plane connection 758. In some embodiments, NAC 732n receives User Mapping information from a TT in the same network such as TT 722. In some embodiments, NAC 732n receives this information from TT's in other shared networks such as TT 7122. In some embodiments, NAC 732n forwards this information to firewall 742.

In some embodiments, firewall 742 is configured to receive one or more data packets from one or multiple NAC's. After a data packet is received, firewall 742 is configured to determine whether the data packet is encapsulated. Upon a determination that the data packet is encapsulated, firewall 742 decapsulates the encapsulated data packet, applies security policies to the data packet, and forwards or drops the data packet based on the application of one or more security policies. Upon a determination that the packet is not encapsulated, firewall 742 may apply security policies to the data packet and subsequently forward the data packet to a next destination or drop the data packet. In some embodiments, firewall 742 forwards one or more data packets to app 752a, 752b, . . . , 752n.

In some embodiments, firewall 742 executes process 300.

In some embodiments, firewall 742 receives User Mapping information through control plane connection 764 from NAC 732n. In some embodiments, the NAC which communicates User Mapping information is different from the NAC which forwards a data packet. In some embodiments, the User Mapping information is forwarded by a User-ID Redistribution Agent on a different shared network, such as, 7162. A User-ID Redistribution agent may be a TT on any related shared network (e.g. 7122) or may be a NA connector on any related shared network (e.g. 7132a).

To illustrate, firewall 742 receives an encapsulated data packet originating from User A's device forwarded by NAC 732a. While executing process 300, firewall 742 decapsulates the data packet and determines the source-IP of the data packet. With only this information, firewall 742 is not able to determine that the data packet originated from User A. However, before User A used this device to connect to shared network 762, User A used the same device to connect to shared network 7162. Shared network 7162 has stored the User-ID to source-IP mapping for User A and its device. Shared network 7162 communicates this User Mapping information to NAC 732n through 758. NAC 732n communicates this User Mapping information to firewall 742 through control plane connection 764. With this information, firewall 742 can determine that User A is the original sender of the data packet and apply security policies.

In some embodiments, apps 752a, 752b, . . . , 752n are part of the same broader network as apps 752a and 7152n. In some embodiments, a client which establishes a connection with gateway 702, may access app 7152a. In some embodiments, a data packet which is forwarded to 7152a through gateway 702 will also be routed through firewall 7142. In some embodiments, firewall 7142 uses User Mapping information from shared network 762 to apply security policies to network traffic routed through gateways 702 and 703. In some embodiments, particular apps, such as app 7152n, are protected by particular firewalls, such as firewall 7142. In some embodiments, there 1:n apps on each shared network which are protected by a particular firewall.

For example, Company owns Network 1 and Network 2. Company's security services are configured to allow employees connecting from Network 1 to access Network 2. Suppose Company Employee A connects to a Network 1 gateway (e.g. 703) seeking access to a Network 2 app (e.g. 7152a). In order to access the Network 2 app, Employee A's data packet must go through Network 2's firewall. Further, Employee A's User Mapping information may need to be communicated from Network 1 to the Network 2 firewall (e.g. firewall 7142). Network 1 and Network 2 are configured to communicate User Mapping information through control plane connections (e.g. 758). Therefore, the Network 2 firewall can appropriately apply security policies to data packets routed by Employee A using the User Mapping information from Network 1.

System 700 demonstrates how a mesh configuration is utilized in related shared networks with enhanced ability to apply security protocols to network traffic. In some embodiments of system 700, components in shared networks are interconnected and certain components in each network are connected to the other network. The mesh configuration is desirable because the networks can manage high amounts of network traffic and can maintain function even when one component fails. FIG. 7 is an example of a mesh being formed by two networks; however, a mesh can be formed with two or more networks.

In some embodiments, the control plane connections 758 of one or multiple shared networks 762 and 7162 form a mesh. The mesh ensures that if one part fails such as TT 7112, control plane information known somewhere in the related networks, is still available to other components in each network such as NAC 7132a and NAC 732b.

In some embodiments, the data plane connections 758 of one or multiple shared networks 762 and 7162 form a mesh. The mesh ensures that if one part fails such as TT 7112, data plane information known somewhere in the related networks, is still available to other components in each network such as NAC 7132a and NAC 732b.

In some embodiments, the computing devices which implement shared network 762 are in a different location than those of shared network 7162, but the shared networks still form a mesh. For example, a regional shared network (e.g. 762) can be located on the West Coast of the USA, while a regional shared network (e.g. 7162) is located on the East Coast. In this example, clients connecting from the East Coast will connect through gateways on the East Coast regional shared network but may still have access to the West Coast region network because of the mesh configuration.

In some embodiments, certain data packets may be routed through certain shared networks, regardless of the location of the client. For example, a client on the West Coast may connect to a gateway in an East Coast shared network because the West Coast client is attempting to access resources only available in the East Coast shared network.

In some embodiments, the shared networks are in the same physical location but are responsible for different data packets. For example, two shared networks (e.g. 762 and 7162) may both be physically located in the West Coast and owned by Company. Company grants access to Resource A on shared network A and Resource B on shared network B. In this example, Company Employee would need to connect to shared network A to reach Resource A.

In some embodiments, all resources available on both shared networks are accessible through either shared network. In some embodiments, data packets arriving at gateway 702 and 703 can access apps 7152a, . . . , 7152n and 752a, 752b, . . . , 752n and vice versa.

In some embodiments, data plane information is communicated between the TT's in each network through connections, such as 712 to 7112 via 748. Even though only two TT's are depicted, it should be understood that each network can have any number of TT's which can be completely connected. In some embodiments, control plane access between shared networks is facilitated by communications between TT's of one network and the NA connectors of another network.

In some embodiments, a single TT acts as a User-ID Redistribution agent for one shared network. The single TT 712 receives all the User Mapping information from one shared network 762. In some embodiments, TT 712 communicates User Mapping information with NAC 732n in the shared network 762 through connection 758. NAC 732n communicates the User-ID mapping information with firewall 742 through connection 764. In some embodiments, TT 712 in a shared network communicates User-ID mapping information to firewall 742 directly through connection 757.

In some embodiments, a single TT 712 acts as the User-ID Redistribution agent for one or more shared networks. TT 722 receives User Mapping information from shared network 7162 through control plane connection 758. TT 722 uses this information to compile User Mapping information which is associated with network traffic across shared networks 762 and 7162. TT 722 communicates this information with downstream components in both shared networks through control plane connection 758.

For example, Employee A located in Region B uses a new mobile device to connect to his company's shared network through Region B's network infrastructure (GW's, TT's etc.). Later, Employee A visits Region A with the same mobile device and connects to the company shared network through Region A's network infrastructure. Region B's shared network will communicate that Employee A's User-ID is associated with the mobile device's IP address to Region A's shared network. Therefore, Region A's TT's will know the source-IP to User-ID mapping of Employee's A new mobile device, even though Employee A has never used the mobile device in Region A. Now, if Employee A sends a data packet to Region A's firewall, it will be able to determine the Source-IP (because it is encapsulated with the packet). Then, combined with the User-ID to Source-IP mapping information communicated from Region B, it will be able to determine Employee A sent the particular data packet.

In some embodiments, system 700 utilizes a mesh configuration to load balance high amounts of network traffic between one or more shared networks in a mesh. For example, suppose there is a high amount of network traffic to app 752n. Shared network 762 determines that TT 712 and TT 722 are overwhelmed and will likely fail if the network traffic exceeds a certain threshold. Upon making this determination, a TT 712 can send a signal to the rest of the shared network. In response, gateway 7162 becomes available to receive network traffic routed for app 752n. Gateway 7162 It uses data plane connection 748 and control plane connection 758 to route the network traffic directly to NAC 732n thus diverting traffic around TT 712 and 722. In this example, TT 712 and 722 will not fail and the users of the network will continue to have a robust connection to app 752n.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    receiving from a first tunnel terminator associated with a first region user-identification (user-ID) mapping information, wherein the first tunnel terminator associated with the first region received the user-ID mapping information from a second tunnel terminator associated with a second region;

receiving a data packet that includes a header and a payload from the first tunnel terminator associated with the first region via a network access (NA) connector, wherein the NA connector performs source network address translation (SNAT) on the data packet, wherein the data packet was sent from a client device unknown to the first tunnel terminator associated with the first region, but known to the second tunnel terminator associated with the second region;

determining whether the data packet is encapsulated based on a value of a field in the header; and applying one or more security policies to the data packet based on whether the data packet is encapsulated and the encapsulated information associated with the data packet and the user-ID mapping information received using a direct control plane connection with the first tunnel terminator, wherein the encapsulated information includes at least an identifier associated with a source of the data packet.

2. The method of claim 1, in response to determining that the data packet is encapsulated, decapsulating the data packet.

3. The method of claim 2, further comprising:
accessing encapsulated information associated with the data packet; and
applying the one or more security policies to the data packet based on the encapsulated information associated with the data packet.

4. The method of claim 3, wherein applying the one or more security policies to the data packet includes forwarding the data packet to a destination associated with the data packet.

5. The method of claim 4, wherein the destination associated with the data packet is a public destination, a cloud destination, or an application.

6. The method of claim 3, wherein applying the one or more security policies to the data packet includes dropping the data packet.

7. The method of claim 1, wherein the identifier associated with the source of the data packet is a source internet protocol address associated with a client device.

8. The method of claim 1, wherein in response to determining that the data packet is not encapsulated, the one or more security policies applied to the data packet are based on a device from which the data packet is received.

9. The method of claim 8, wherein the device from which the data packet is received is a network address translation device.

10. The method of claim 1, wherein the data packet is received from a network address translation device.

11. The method of claim 10, wherein the network address translation device receives the data packet from the client device and encapsulates the data packet.

12. The method of claim 11, wherein the network address translation device performs source network address translation on the data packet and provides the data packet to a firewall.

13. The method of claim 1, further comprising receiving mapping information associated with a user device.

14. The method of claim 13, wherein the one or more security polices are applied to the data packet based on whether the data packet is encapsulated, the received user-ID mapping information, and the user device.

15. The method of claim 1, wherein the NA connector is associated with a first shared network or a second shared network.

16. A system, comprising:
a processor configured to:
receive from a first tunnel terminator associated with a first region user-identification (user-ID) mapping information, wherein the first tunnel terminator associated with the first region received the user-ID mapping information from a second tunnel terminator associated with a second region;
receive a data packet that includes a header and a payload from the first tunnel terminator associated with the first region via a network access (NA) connector, wherein the NA connector performs source network address translation (SNAT) on the data packet, wherein the data packet was sent from a client device unknown to the first tunnel terminator associated with the first region, but known to the second tunnel terminator associated with the second region;
determine whether the data packet is encapsulated based on a value of a field in the header; and
applying one or more security policies to the data packet based on whether the data packet is encapsulated and the encapsulated information associated with the data packet and the user-ID mapping information received using a direct control plane connection with the first tunnel terminator, wherein the encapsulated information includes at least an identifier associated with a source of the data packet; and
a memory coupled to the processor and configured to provide the processor with instructions.

17. The system of claim 16, wherein in response to determining that the data packet is encapsulated, the processor is configured to decapsulate the data packet.

18. A non-transitory computer readable medium comprising computer instructions for:
receiving from a first tunnel terminator associated with a first region user-identification (user-ID) mapping information, wherein the first tunnel terminator associated with the first region received the user-ID mapping information from a second tunnel terminator associated with a second region;
receiving a data packet that includes a header and a payload from the first tunnel terminator associated with the first region via a network access (NA) connector, wherein the NA connector performs source network address translation (SNAT) on the data packet, wherein the data packet was sent from a client device unknown to the first tunnel terminator associated with the first region, but known to the second tunnel terminator associated with the second region;
determining whether the data packet is encapsulated based on a value of a field in the header; and
applying one or more security policies to the data packet based on whether the data packet is encapsulated and the encapsulated information associated with the data packet and the user-ID mapping information received using a direct control plane connection with the first tunnel terminator, wherein the encapsulated information includes at least an identifier associated with a source of the data packet.

* * * * *